US007656348B2

(12) United States Patent
Ahmed et al.

(10) Patent No.: US 7,656,348 B2
(45) Date of Patent: Feb. 2, 2010

(54) SYSTEM AND/OR METHOD FOR DETERMINING SUFFICIENCY OF PSEUDORANGE MEASUREMENTS

(75) Inventors: Rizwan Ahmed, Orange, CA (US); Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/510,334

(22) Filed: Aug. 24, 2006

(65) Prior Publication Data

US 2007/0268177 A1 Nov. 22, 2007

Related U.S. Application Data

(60) Provisional application No. 60/802,020, filed on May 19, 2006.

(51) Int. Cl.
*G01S 1/00* (2006.01)
*G01S 5/14* (2006.01)
(52) U.S. Cl. .............................. 342/357.02; 342/357.17
(58) Field of Classification Search ............ 342/357.02, 342/357.17
See application file for complete search history.

(56) References Cited

U.S. PATENT DOCUMENTS

| 6,452,545 B2 | 9/2002 | Araki et al. |
| 6,535,163 B1 | 3/2003 | Sahai et al. |
| 6,873,910 B2* | 3/2005 | Rowitch et al. ............. 701/213 |
| 2002/0050944 A1 | 5/2002 | Sheynblat et al. |
| 2003/0052821 A1* | 3/2003 | Holt ........................... 342/453 |
| 2003/0151574 A1 | 8/2003 | Mauro et al. |
| 2004/0078140 A1 | 4/2004 | Rowitch et al. |
| 2005/0010365 A1* | 1/2005 | Chapman et al. ............... 702/3 |
| 2006/0001570 A1* | 1/2006 | Salas et al. ............. 342/357.17 |

OTHER PUBLICATIONS

International Search Report-PCT/US07/069306-International Search Authority-European Patent Office-Jun. 26, 2008.
Written Opinion-PCT/US07/069306-International Search Authority-European Patent Office-Jun. 26, 2008.
Understanding GPS - Principles and Applications, Chapter 7, Elliot Kaplan 1996.
International Preliminary Report on Pantentability, PCT/US2007/069306 -The International Bureau of WIPO - Geneva, Switzerland, Dec. 4, 2008.

* cited by examiner

*Primary Examiner*—Thomas H Tarcza
*Assistant Examiner*—Harry Liu
(74) *Attorney, Agent, or Firm*—Andrea L. Mays; Arnold J. Gum; Jimmy Cheng

(57) ABSTRACT

The subject matter disclosed herein relates to a system and method for determining a sufficiency of measurements for locating positions. In one example, although claimed subject matter is not so limited, a process to improve accuracy of pseudorange measurements may be terminated in response to a weighting of quantitative assessments of at least some of such pseudorange measurements.

35 Claims, 6 Drawing Sheets

SYSTEM AND/OR METHOD FOR DETERMINING SUFFICIENCY OF PSEUDORANGE MEASUREMENTS

This application claims the benefit of and is a non-provisional of U.S. Provisional Application Ser. No. 60/802,020 filed on May 19, 2006, entitled "An Improved Measurement Sufficiency Test for GPS Searches Using a Plurality of Search Modes" which is assigned to the assigner hereof and which is hereby expressly incorporated by reference in its entirety for all purposes.

BACKGROUND

1. Field

The subject matter disclosed herein relates to determining a location of a position based upon signals received from geo-location satellites.

2. Information

A satellite positioning system (SPS) typically comprises a system of earth orbiting satellites enabling entities to determine their location on the earth based, at least in part, on signals received from the satellites. Each such SPS satellite typically transmits a signal marked with a repeating pseudorandom noise (PN) code of 1,023 chips distinguishing the satellite from other SPS satellites where the 1,023 chips repeat every millisecond. The signal is also typically modulated with data bits, where each data bit has a 20 ms duration in the modulated signal.

FIG. 1 illustrates a typical application of a geo-location system, whereby a subscriber station 100 in a wireless communications system receives transmissions from satellites 102a, 102b, 102c, 102d in the line of sight to subscriber station 100, and derives time measurements from four or more of the transmissions. Subscriber station 100 provides the measurements to position determination entity (PDE) 104, which determines the position of the station from the measurements. Alternatively, the subscriber station 100 may determine its own position from this information.

Subscriber station 100 may search for a transmission from a particular satellite by correlating the PN code for the satellite with a received signal. The received signal typically comprises a composite of transmissions from one or more satellites within a line of sight to a receiver at station 100 in the presence of noise. A correlation may be performed over a range of code phase hypotheses known as the code phase search window $W_{CP}$, and over a range of Doppler frequency hypotheses known as the Doppler search window $W_{DOPP}$. Such code phase hypotheses are typically represented as a range of PN code shifts while such Doppler frequency hypotheses are typically represented as Doppler frequency bins.

A correlation is typically performed over an integration time "I" which may be expressed as the product of $N_c$ and M, where $N_c$ is the coherent integration time, and M is number of coherent integrations which are non-coherently combined. For a particular PN code, correlation values are typically associated with corresponding PN code shifts and Doppler bins to define a two-dimensional correlation function. Peaks of the correlation function are located and compared to a predetermined noise threshold. The threshold is typically selected so that the false alarm probability, the probability of falsely detecting a satellite transmission, is at or below a predetermined value. A time measurement for the satellite is typically derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

Current subscriber station architectures place significant constraints on the process of searching for location determination signals. In a shared RF architecture, for example, core RF circuitry in the subscriber station is typically shared between a location determination receive path, and voice/data communication transmit and receive paths. Accordingly, employing such a shared RF architecture in an SPS function may diminish an ability of such a shared architecture to perform a voice/data communication function or other function sharing common resources. Accordingly, there is a desire to reduce use of such common resources for determining locations of position.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
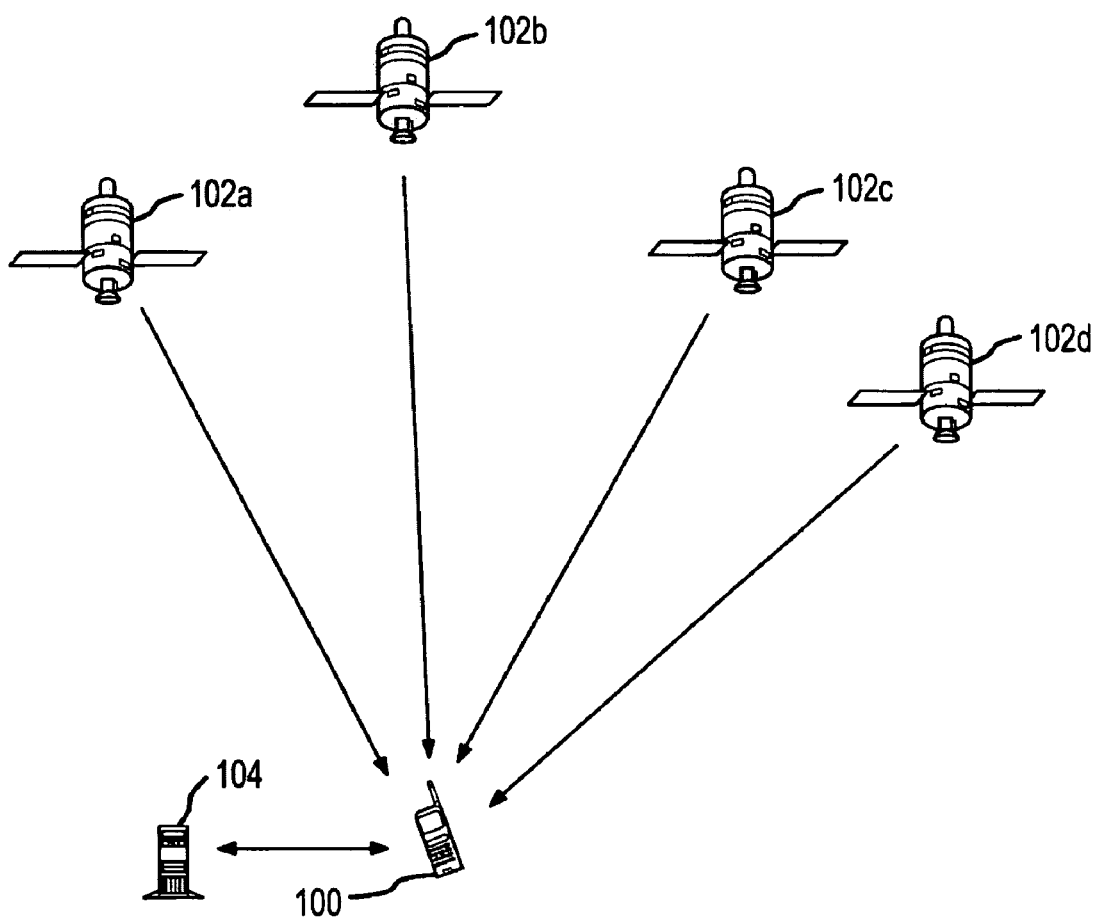
FIG. 1 is a schematic diagram of a geo-location system according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The methodologies described herein may be implemented by various means depending upon applications according to particular embodiments. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or a combination thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "weighting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular embodiment, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude and longitude. Alternatively, such a location may be represented as a street address, municipality or other governmental jurisdiction, postal zip code and/or the like. However, these are merely examples of how a location may be represented according to particular embodiments and claimed subject matter is not limited in these respects.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an embodiment, a device and/or system may estimate its location based, at least in part, on signals received from SVs. In particular, such a device and/or system may obtain "pseudorange" measurements comprising approximations of distances between associated SVs and a navigation satellite receiver. In a particular embodiment, such a pseudorange may be determined at a receiver that is capable of processing signals from one or more SVs as part of a Satellite Positioning System (SPS). Such an SPS may comprise, for example, a Global Positioning System (GPS), Galileo, Glonass, a system that uses satellites from a combination of these systems, or any SPS developed in the future. As used herein, an SPS will also be understood where appropriate to include pseudolite systems—ground-based transmitters that broadcast a PN code or other ranging code (similar to a GPS or CDMA cellular signal), or systems that use a combination of satellites and pseudolites. To determine its position, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in a GPS type of SPS as specific illustrations according to particular embodiments, it should be understood that these techniques may also apply to other types of SPS', and that claimed subject matter is not limited in this respect.

According to an embodiment, a pseudorange measurement may comprise a single measurement of a distance between a navigation receiver and an SV. Here, accordingly, accuracy of an initial pseudorange measurement to a particular SV may be improved by obtaining one or more subsequent pseudorange measurements to replace and/or statistically combine with initial pseudorange measurement. Therefore, in this context, such a pseudorange measurement may also comprise a distance between a navigation receiver and an SV estimated based, at least in part, upon multiple individual pseudorange measurements taken.

The accuracy of an estimate of a location based on pseudorange measurements may be determined, at least in part, on accuracy of the pseudorange measurements. According to an embodiment, although claimed subject matter is not limited in this respect, a satellite receiver may continue attempting to improve the accuracy associated with pseudorange measurements until such a location may be estimated with sufficient accuracy. After a satellite receiver has estimated a location with sufficient accuracy, it may cease attempting to improve accuracy of the pseudorange measurements and employ resources used for obtaining pseudorange measurements to another function.

A "quantitative assessment of accuracy" as referred to herein relates to a quantitative metric associated with accuracy of an estimate of a value. For example, such a quantitative assessment of accuracy may comprise a variance associated with an estimate of a value based upon one or more measurements. In another embodiment, such a quantitative assessment of accuracy may comprise a root mean square error associated with an estimate of a value based upon one or more measurements. In a particular embodiment, although claimed subject matter is not limited in this respect, such a quantitative assessment of accuracy may relate to a quantitative metric associated with accuracy of a pseudorange measurement. However, these are merely examples of a quantitative assessment of accuracy and claimed subject matter is not limited in these respects.

While accuracy of pseudorange measurements may affect the accuracy of an estimated location derived from such pseudorange measurements, locations of SVs used for generating such pseudorange measurements may also affect the accuracy of such a location estimate. In a particular embodiment, locations of SVs in orbit with respect to one another and/or with respect to a receiver may provide "geometries" affecting accuracy of an estimated location of the receiver based, at least in part, on pseudorange measurements to said SVs. In one embodiment, such geometries may be expressed, at least in part, by approximated azimuth and elevation angles of locations of SVs with respect to a location of a receiver. However, this is merely an example of how such geometries may be expressed according to a particular embodiment and claimed subject matter is not limited in this respect.

Briefly, one embodiment relates to a process of attempting to improve accuracy of pseudorange measurements for estimating a location of a position. Quantitative assessments of accuracy associated with a plurality of pseudorange measurements to SVs used for estimating such a position of a location may be weighted according to geometries associated with the SVs. The process of attempting to improve the accuracy of the pseudorange measurements may then be terminated or exited in response to the weighted quantitative assessments. However, this is merely sample embodiment an claimed subject matter is not limited in this respect.

In an alternative embodiment, pseudorange measurements to space vehicles SVs at a location may be determined using a first search dwell. A second search dwell may be selectively employed to increase the number of pseudorange measurements and/or increase the accuracy of the pseudorange measurements in response to at least some quantitative assessments associated with the pseudorange measurements which are weighted according to geometries associated with the SVs. Again, this is merely an example embodiment and claimed subject matter is not limited in this respect.

Figure 2:
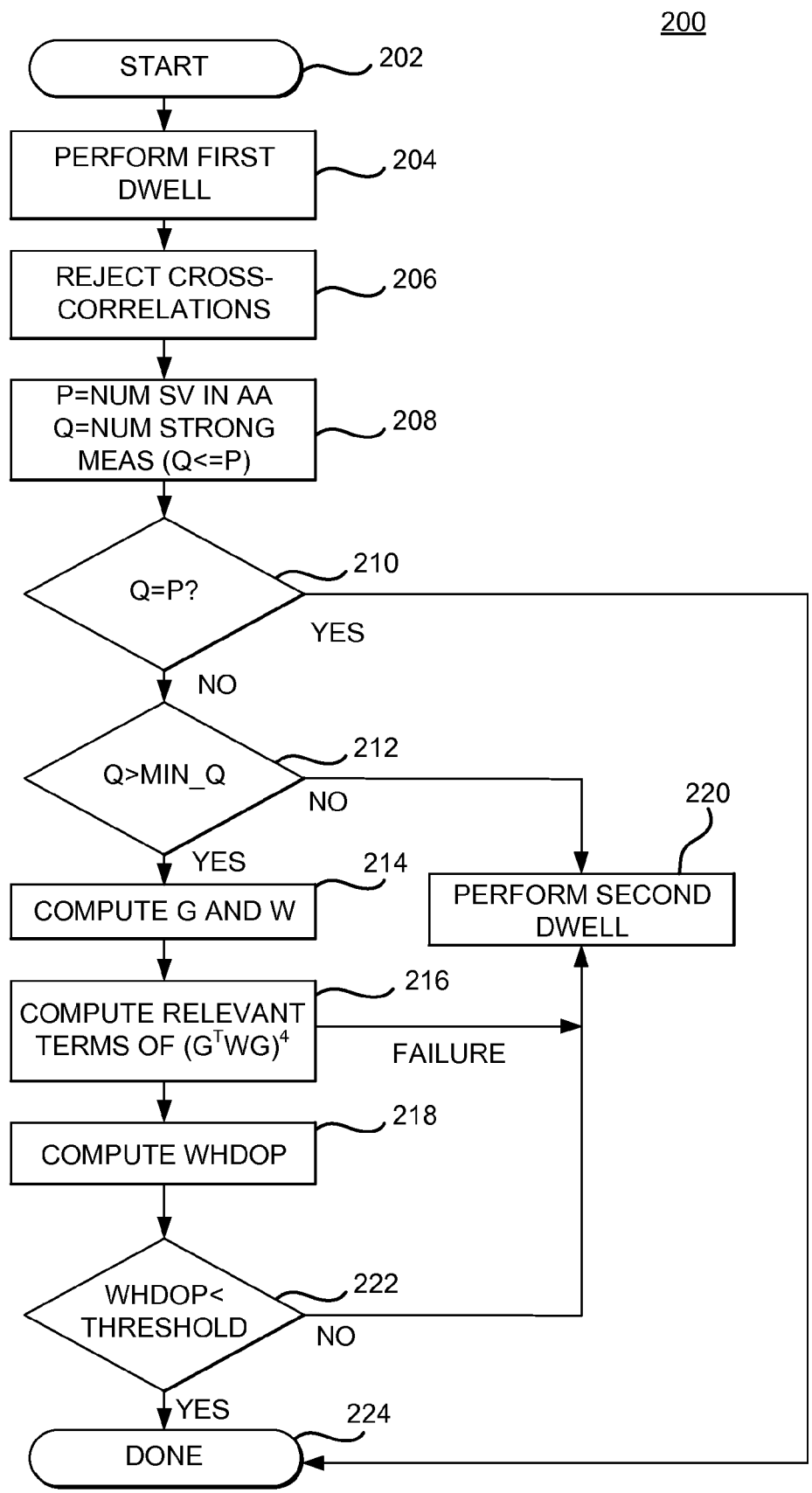
FIG. 2 is a flow diagram illustrating a process for determining a position of a receiver from a geo-location system according to an embodiment.

FIG. 2 is a flow diagram illustrating a process 200 for estimating a location of a position from a geo-location system according to an embodiment. In one embodiment, process 200 may be performed by a subscriber device comprising a receiver to receive signals from SVs. Such a subscriber device may be in communication with a PDE over terrestrial wireless communication link, for example. Such a subscriber device may employ common processing resources for determining a location of its position based, at least in part, on signals received from SVs and for performing tasks and/or functions such as, for example, voice and/or data communications over wireless communication links. Such a device may employ at least some of its processing resources during "dwells" to estimate its location from signals received from SVs. Processing during such dwells may provide pseudorange measurements to SVs for use in estimating location using techniques known to those of ordinary skill in the art. In a particular embodiment, although claimed subject matter is not limited in this respect, if a device estimates its location with sufficient accuracy following performing a first dwell at block 204, the device may not perform a second dwell at block 220 to estimate its position with greater accuracy. By not employing the second dwell, such a subscriber device may be able to deploy common processing resources to perform other platform functions instead and shorten the time required to obtain a location fix.

In an alternative embodiment, portions of process 200 may be performed by a device in communication with a subscriber station such as, for example, a PDE. For example, a subscriber station may provide pseudorange measurements to a PDE (e.g., over a terrestrial wireless communication link) while the PDE estimates the location of the subscriber station based, at least in part, on the received pseudorange measurements. Also, such a PDE may employ portions of process 200 to determine whether the subscriber station is to perform a second dwell at block 220 as discussed below, and signal to the subscriber station accordingly.

Process 200 may commence at 202 in response any one of several events such as, for example, acquisition of a signal from a base station at a subscriber station, an input from a user interface or initiation of an emergency "911" call, to name just a few. Block 204 may comprise performing a first dwell to obtain pseudorange measurements based, at least in part, upon signals received from SVs. According to a particular embodiment, and as discussed below with reference to FIGS. 3 and 4, such pseudorange measurements may be based, at least in part, on a correlation of a range of code phase hypotheses, providing a code phase search window, and a range of Doppler frequency hypotheses, providing a Doppler search window. However, this is merely an example of how pseudorange measurements may be obtained from a dwell according to a particular embodiment and claimed subject matter is not limited in this respect.

According to an embodiment, a dwell may employ a particular "search mode" for obtaining a pseudorange measurement characterized by a set of system parameters. As illustrated in Table 1 below in connection with a particular example, such a set of system parameters characterizing a particular search mode may comprise one or more of a frequency search band, number of frequency bins, number of code bins, coherent integration time, number of non-coherent integration segments, total integration time, detection threshold (e.g., based on $C/N_o$) and sensitivity (e.g., based on $C/N_o$). However, these are merely examples of system parameters that may characterize a search mode and claimed subject matter is not limited in this respect. In a particular embodiment, dwells performed at blocks 204 and 220 may employ the same search mode, but may employ different search modes in different embodiments depending on particular implementation preferences.

It should be understood that signals received from some SVs at a device may be stronger than signals received from other SVs due to, for example different transmission power levels being employed at different SVs, blockage of certain signals by physical barriers and different distances between the device and different SVs. In the detection of PN code signals from an SV, block 206 may employ signal processing to remove the presence of cross-correlations resulting from PN code signals transmitted by other SVs.

According to an embodiment, although claimed subject matter is not limited in this respect, there are a finite number ("P") of SVs that may be within the line of sight or otherwise "visible" to a device. In a particular embodiment, although claimed subject matter is not limited in this respect, at block 208 a subscriber device may determine P from an acquisition assistance (AA) message received from a PDE over a terrestrial wireless communication link, for example. Such a subscriber device may also identify a number of SVs ("Q") among the set of P SVs from which sufficiently strong measurements have been produced during the first dwell at block 204. In one embodiment, block 208 may determine such a strength of a measurement based, at least in part, on a signal-to-noise ratio resulting from a signal detected from an associated SV as illustrated in U.S. Pat. No. 6,873,910 to Rowitch et al. titled "Procedure for Searching for Position Determination Signals Using a Plurality of Search Modes." In an alternative embodiment, such a strength of a measurement may be based, at least in part, on a quantitative assessment of accuracy associated with the measurement. However, these are merely examples of how a strength of a pseudorange measurement may be determined according to particular embodiments and claimed subject matter is not limited in this respect.

If the number of SVs "Q" for which a device has produced sufficiently strong measurement equals the number of SVs visible to the device P, as determined at diamond 210, process 200 may terminate or exit at 224 such that a second dwell is not performed at block 220. Otherwise, diamond 202 may initiate such a second dwell at block 220 if Q is less than a minimum number MIN_Q of desired measurements.

If Q meets or exceeds MIN_Q as determined at diamond 212, blocks 214 through 218 may determine a quantitative location accuracy metric based, at least in part, on quantitative assessments of accuracy of pseudorange measurements obtained from at least some of the SVs visible to the device and geometries associated with the SVs. Such a location accuracy metric may then be compared with a threshold value THRESHOLD at diamond 222 to determine whether to perform a second dwell at block 220. As shown in the particular illustrated embodiment, process 200 may terminate a process to improve the accuracy of pseudorange measurements by not performing a second dwell at block 220 in response to a comparison of the location accuracy metric to THRESHOLD at diamond 222.

According to a particular embodiment, although claimed subject matter is not limited in this respect, a location accuracy metric (e.g., to be compared with THRESHOLD at diamond 222), may be based, at least in part, on quantitative assessments of accuracy associated with pseudorange measurements obtained from a first dwell at block 204. In particular, such a location accuracy metric may be based, at least in part, on such quantitative assessments which are weighted according to geometries associated with SVs used to determine the pseudorange measurements. In a particular embodiment, although claimed subject matter is not limited in this respect, block 218 may determine such a location accuracy metric as a weighted horizontal dilution of precision (WHDOP) expressed in relations (1) and (2) as follows:

$$\text{WHDOP} = \sqrt{Tr(\Sigma_{xy})} \qquad (1)$$

$$\Sigma_{xy} = [(G^T W G)^{-1}]_{2 \times 2} \qquad (2)$$

Where:

G comprises a matrix quantifying affects of satellite geometries on the accuracy of a position location estimate; and W comprises a matrix having elements based, at least in part, on a quantitative assessments of accuracy of pseudorange measurements used for determining the position location estimate.

The operator $[:]_{2\times 2}$ takes the 2×2 upper left submatrix of the argument (e.g., $(G^T W G)^{-1}$ may comprise a 4×4 matrix in a particular embodiment). At block 214, the matrix G may be given by:

$$G = \begin{bmatrix} \cos(\alpha_1)\sin(\beta_1) & \cos(\alpha_1)\cos(\beta_1) & \sin(\alpha_1) & 1 \\ \cos(\alpha_2)\sin(\beta_2) & \cos(\alpha_2)\cos(\beta_2) & \sin(\alpha_2) & 1 \\ \vdots & \vdots & \vdots & \vdots \\ \cos(\alpha_N)\sin(\beta_N) & \cos(\alpha_N)\cos(\beta_N) & \sin(\alpha_N) & 1 \end{bmatrix}$$

where $\alpha_i$=elevation of $SV_i$, $\beta_i$=azimuth of $SV_i$ for $SV_1$, $SV_2$, ... $SV_N$ visible to a receiver at a device. Here, according to a particular embodiment, $\alpha_i$ and $\beta_i$ may be received from a PDE or other device in an AA message over a terrestrial wireless communication link. Alternatively, a device may independently determine such angles from signals from main lobe detections at a device antenna using phased array signal processing, for example. However, these are merely examples of how a device may obtain information descriptive of geometries associated with SVs and claimed subject matter is not limited in these respects.

According to a particular embodiment, a quantitative assessment of accuracy associated with a pseudorange measurement may comprise a variance associated with such a pseudorange measurement. Here, block 214 may determine matrix W as follows:

$$W = \begin{bmatrix} 1/\sigma_1^2 & 0 & \cdots & 0 \\ 0 & 1/\sigma_2^2 & 0 & \vdots \\ \vdots & 0 & \ddots & 0 \\ 0 & \cdots & 0 & 1/\sigma_N^2 \end{bmatrix}$$

where $\sigma_1^2, \sigma_2^2, \ldots \sigma_N^2$=variances of pseudorange measurements associated with $SV_1, SV_2, \ldots SV_N$ visible to a receiver at a device.

In an alternative embodiment, a quantitative assessment of accuracy associated with a pseudorange measurement may comprise a root mean square error (RMSE) associated with the pseudorange measurement. In this alternative embodiment, block 214 may determine matrix W as follows:

$$W = \begin{bmatrix} 1/RMSE_1^2 & 0 & \cdots & 0 \\ 0 & 1/RMSE_2^2 & 0 & \vdots \\ \vdots & 0 & \ddots & 0 \\ 0 & \cdots & 0 & 1/RMSE_N^2 \end{bmatrix}$$

where $RMSE_1$, $RMSE_2$, ... $RMSE_N$ comprise root mean square errors associated with pseudorange measurements associated with $SV_1$, $SV_2$, ... $SV_N$ visible to a receiver at a device.

Here, block 214 may access a pre-computed value for $RMSE_i$ from a look-up table in memory indexed by an elevation angle of $SV_i$ (e.g., $\alpha_i$) and an assessment of the strength of the signal such as $C/N_o$, where C represents a strength of PN code signals received from $SV_i$ and $N_o$ represents a noise power at a receiver. However, this is merely an example of how a root mean square error may be obtained for determining WHDOP according to a particular embodiment and claimed subject matter is not limited in this respect.

It should be understood that depending on values of particular elements in matrices G and W, the expression $(G^TWG)^{-1}$ may provide an undetermined result if the expression $G^TWG$ does not provide an invertible matrix. Accordingly, if block 216 fails to compute $(G^TWG)^{-1}$ (e.g., because the expression $G^TWG$ is not invertible), process 200 may initiate performing a second dwell at block 220.

It should be observed that WHDOP, in the particular embodiment according to relation (1), sets forth a measure of horizontal error distribution and has units in linear length such as meters. Accordingly, a value for THRESHOLD to be compared with WHDOP at diamond 222 may be similarly expressed in units of linear length. In a particular embodiment where errors in pseudorange measurements are Gaussian distributed, horizontal position components may comprise Gaussian random variables. However, an overall horizontal error (e.g., $(East\_error^2+North\_error^2)^{1/2}$) may have a chi-squared distribution with two degrees of freedom where contours of equal probability are ellipsoidal. Nevertheless, a circular error probable model may approximate such a distribution as follows:

$$CEP_{50} \approx 0.75 \cdot WHDOP$$

$$CEP_{95} \approx 2.00 \cdot WHDOP$$

where $CEP_X$ defines a radius of a circle capturing X % of an error distribution when centered at the correct location. In a particular embodiment, a performance requirement may specify a particular radius (e.g., in linear length units) for a particular $CEP_X$. Accordingly, a value for THRESHOLD to be compared with WHDOP at diamond 222 may be determined for a desired radius about center and Z % center error probable according to empirical relationships between CEP and WHDOP.

According to an embodiment, a particular value for THRESHOLD may be selected based, at least in part, on a trade-off between accuracy of a location estimate and time to fix (TTF) such an estimate. Depending on several factors such as the strength of signals received from SVs and noise, reducing a tolerance for accuracy in a location estimate may increase a required TTF the location estimate. Likewise, increasing a tolerance for accuracy in a location estimate may reduce a TTF the location estimate. In particular embodiments, although claimed subject matter is not limited in this respect, a value for THRESHOLD may be selected based, at least in part, on experimental measurements evaluating accuracy of location estimates versus TTF under a variety of conditions.

In one embodiment, a value of THRESHOLD may be selected to optimize relationships among probabilistic variables such as, for example, a probability of not terminating early although pseudorange measurement accuracy is sufficient without a second dwell at block 220, a probability of terminating early and forgoing a second dwell at block 220 even though pseudorange measurement accuracy is not sufficient without the second dwell at block 220, and a probability of correctly deciding to either perform the second dwell at block 220 or forgoing the second dwell if not needed. However, these are merely examples of probabilistic variables that may be optimized in determining a value of THRESHOLD for a particular embodiment and claimed subject matter is not limited in this respect.

Figure 3:
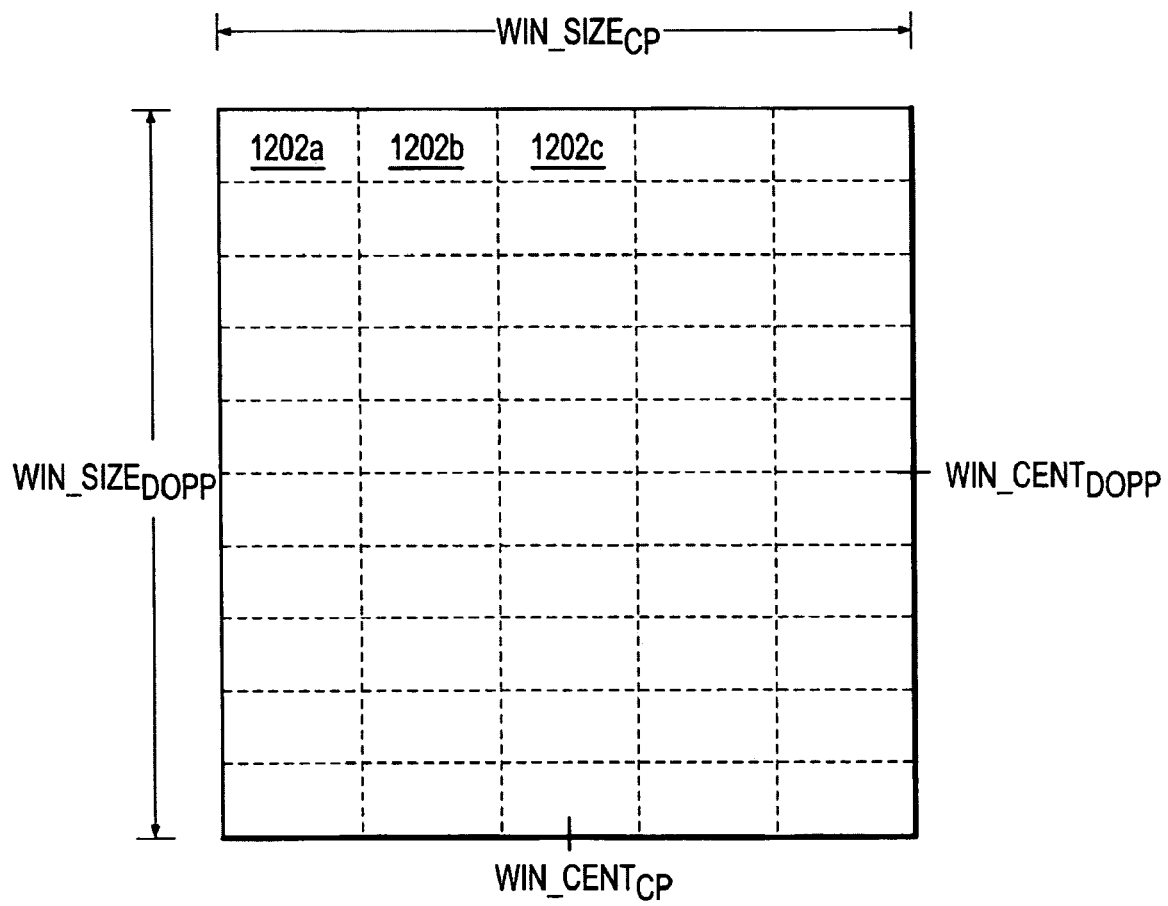
FIG. 3 is a schematic diagram of a two-dimensional domain to be searched for detection of a signal transmitted from a space vehicle according to an embodiment.

As pointed out above, although claimed subject matter is not limited in this respect, dwells performed at blocks 204 and 220 may process signals received at a receiver according to a two-dimensional domain as illustrated in FIG. 3. As illustrated in the aforementioned U.S. Pat. No. 6,873,910, such a two-dimensional domain or "window" may be searched for detection of a signal transmitted from an SV to determine a pseudorange measurement to the SV.

According to an embodiment, an SV which is likely to be visible at a receiver (e.g., as indicated in an AA message) may be associated with a particular set of search window parameters defining a two-dimensional domain of code phase and Doppler frequency hypotheses to be searched for the SV. In one implementation, illustrated in FIG. 3, search window parameters for an SV comprise a code phase search window size, $WIN\_SIZE_{CP}$, a code phase window center, $WIN\_CENT_{CP}$, a Doppler search window size, $WIN\_SIZE_{DOPP}$, and a Doppler window center, $WIN\_CENT_{DOPP}$. In the case where the entity whose position is sought to be determined is a subscriber station in an IS-801 compliant wireless communication system, these parameters may be indicated by an AA message provided to the subscriber station by a PDE.

The two-dimensional search space for an SV illustrated in FIG. 3 shows a code phase axis is a horizontal axis, and a Doppler frequency axis as a vertical axis, but this assignment is arbitrary and could be reversed. The center of the code phase search window is referred to as $WIN\_CENT_{CP}$, and the size of the code phase search window is referred to as $WIN\_SIZE_{CP}$. The center of the Doppler frequency search window is referred to as $WIN\_CENT_{DOPP}$, and the size of the Doppler frequency search window is referred to as $WIN\_SIZE_{DOPP}$.

As pointed out above dwells at blocks 204 and 220 may be formed according to any one of several "search modes" setting forth system parameters tailored to particular performance desired and/or particular processing resources available for a search dwell. Depending on a particular search mode, and as illustrated in FIG. 3, a search space may be partitioned into a plurality of segments 1202a, 1202b, 1202c, each of which is characterized by a range of Doppler frequencies and a range of code phases. In one example, illustrated in Table 1 below, a range of frequencies associated with a segment is +/−250 Hz for search modes 0, 1, and 2, and is +/−62.5 Hz for search mode 3, and the range of code phases associated with a segment is thirty-two chips. In this particular example, a range of frequencies characterizing a segment is divided up into twenty bins, and the range of code phases characterizing a segment is divided into sixty-four bins.

TABLE 1

| Mode | Freq. Search Band (Hz) | # Freq. Bins | # Code Bins | Coh. Integ. Time (ms) | Non-Coh. Integ. | Total Integ. Time (ms) | Det. Thresh. $C/N_o$ (dB-Hz) | Sensitivity $C/N_o$ (dB-Hz) |
|---|---|---|---|---|---|---|---|---|
| 0 | +/−250 | 20 | 64 | 20 | 1 | 20 | 29.8 | 31.0 |
| 1 | +/−250 | 20 | 64 | 20 | 4 | 80 | 25.0 | 26.4 |
| 2 | +/−250 | 20 | 64 | 20 | 44 | 880 | 18.1 | 19.2 |
| 4 | +/−62.5 | 20 | 64 | 80 | 22 | 1760 | 14.0 | 15.45 |

According to an embodiment, a range of code phases characterizing a segment may be equal to the capacity of a channel of a correlator to search of the segment through a single channel pass. In one particular example where the channel capacity is thirty-two chips, for example, a range of code phases characterizing a segment may be likewise thirty-two chips, but it should be appreciated that other examples are possible.

Figure 4:
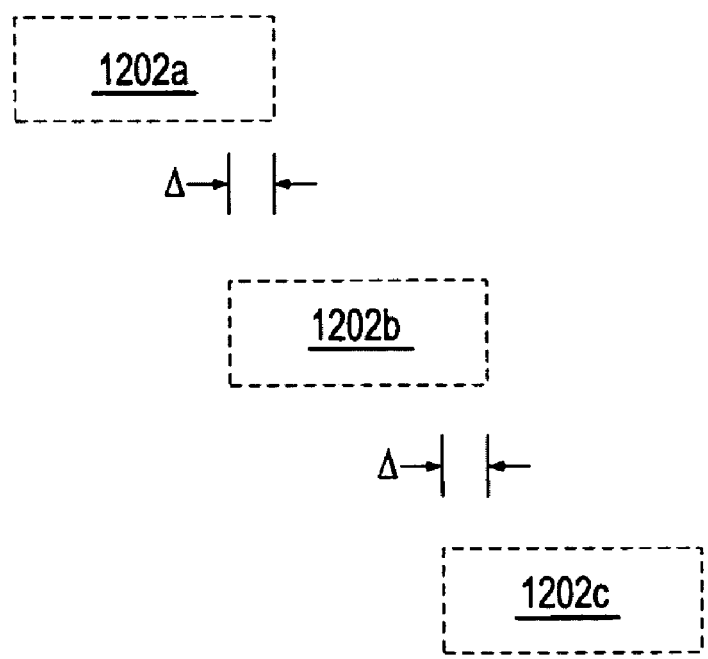
FIG. 4 illustrates an overlap by a prescribed number of chips in a search window to avoid missing peaks that appear at segment boundaries according to an embodiment.

Segments may be caused to overlap by a prescribed number of chips to avoid missing peaks that appear at segment boundaries as illustrated in FIG. 4. Here, a tail end of segment 1202a overlaps the front end of segment 1202b by Δ chips, and the tail end of segment 1202b likewise overlaps the front end of segment 1202c by Δ chips. Because of the overhead due to this overlap, an effective range of code phases represented by a segment may be less than the channel capacity. In the case where the overlap is four chips, for example, an effective range of code phrases represented by a segment may be twenty-eight chips.

Figure 5:
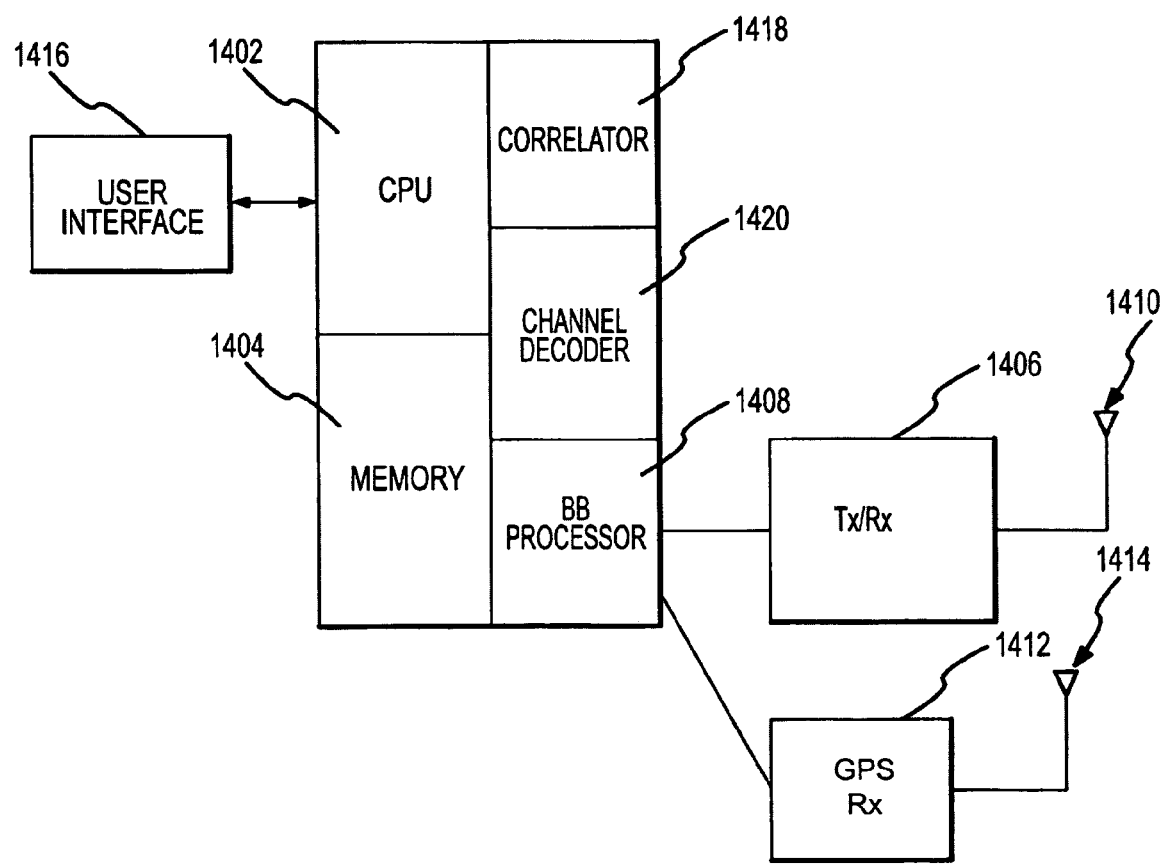
FIG. 5 is a schematic diagram of a system for processing signals to determine a position location according to an embodiment.
Figure 6:
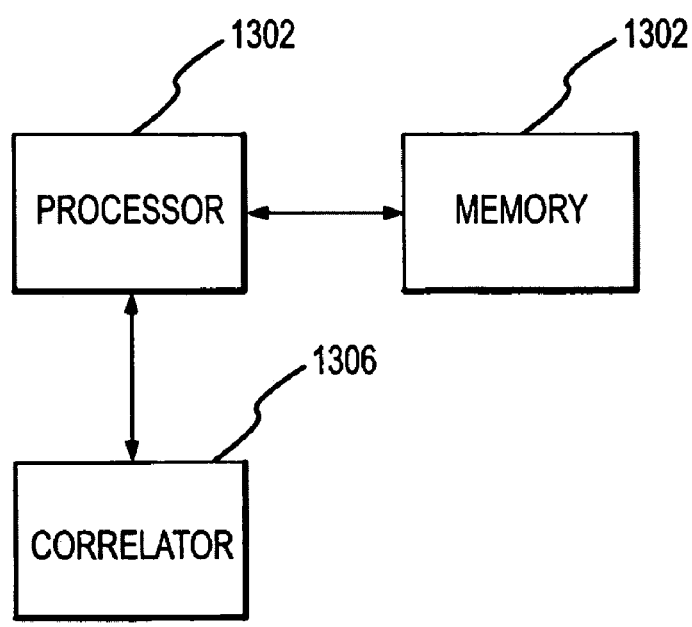
FIG. 6 is a schematic diagram of a subscriber station according to an embodiment.

A system for searching for position determination signals within a prescribed time period is illustrated in FIG. 5 according to a particular embodiment. However, this is merely an example of a system that is capable of searching for position determination signals according to a particular embodiment and other systems may be used without deviating from claimed subject matter. As illustrated in FIG. 6 according to a particular embodiment, such a system may comprise a computing platform including a processor 1302, memory 1304, and correlator 1306. Correlator 1306 may be adapted to produce correlation functions from signals provided by a receiver (not shown) to be processed by processor 1302, either directly or through memory 1304. Correlator 1306 may be implemented in hardware, software, or a combination of hardware and software. However, these are merely examples of how a correlator may be implemented according to particular embodiments and claimed subject matter is not limited in these respects.

According to an embodiment, memory 1304 may store machine-readable instructions which are accessible and executable by processor 1302 to provide at least a portion of a computing platform. Here, processor 1302 in combination with such machine-readable instructions may be adapted to perform all or portions of process 200 illustrated above with reference to FIG. 2. In a particular embodiment, although claimed subject matter is not limited in these respects, processor 1302 may direct correlator 1306 to search for position determination signals as illustrated above and derive measurements from correlation functions generated by correlator 1306.

Returning to FIG. 5, radio transceiver 1406 may be adapted to modulate an RF carrier signal with baseband information, such as voice or data, onto an RF carrier, and demodulate a modulated RF carrier to obtain such baseband information.

An antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1406 for transmission over a wireless communications link. Here, CPU 1402 may obtain such baseband information from an input device within user interface 1416. Baseband processor 1408 may also be adapted to provide baseband information from transceiver 1406 to CPU 1402 for transmission through an output device within user interface 1416.

User interface 1416 may comprise a plurality of devices for inputting or outputting user information such as voice or data. Such devices may include, for example, a keyboard, a display screen, a microphone, and a speaker.

GPS receiver 1412 may be adapted to receive and demodulate GPS satellite transmissions, and provide the demodulated information to correlator 1418.

Correlator 1418 may be adapted to derive GPS correlation functions from the information provided to it by GPS receiver 1412. For a given PN code, for example, correlator 1418 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 1418 may also be adapted to derived pilot-related correlation functions from information relating to pilot signals provided by transceiver 1406. This information may be used by a subscriber station to acquire wireless communications services.

Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, embodiments, implementations, or examples thereof which have been described or suggested. CPU 1402 may be adapted to access and execute such machine-readable instructions. Through execution of these machine-readable instructions, CPU 1402 may direct correlator 1418 to perform dwells employing particular search modes at blocks 204 and 220, analyze the GPS correlation functions provided by correlator 1418, derive measurements from the peaks thereof, and determine whether an estimate of a location is sufficiently accurate. However, these are merely examples of tasks that may be performed by a CPU in a particular embodiment and claimed subject matter in not limited in these respects.

In a particular embodiment, CPU 1402 at a subscriber station may estimate a location the subscriber station based, at least in part, on signals received from SVs during dwells as illustrated above. CPU 1402 may also be adapted to estimate a location of such a subscriber station and determine quantitative assessments of accuracy associated with pseudorange measurements such as RMSEs as illustrated above. Additionally, CPU 1402 may determine whether to terminate a process for improving the accuracy of pseudorange measurements based, at least in part, on such quantitative assessments of accuracy. Alternatively, a subscriber station may provide pseudorange measurements and quantitative assessments of accuracy of same to a PDE (not shown). Such a PDE may then estimate a location of the subscriber station based, at least in part, on the pseudorange measurements. Further, as illustrated above in connection with an alternative embodiment, such a PDE may also determine when to terminate a process of improving accuracy of a location estimate by performing a subsequent search dwell. It should be understood, however, that these are merely examples of systems for estimating a location based, at least in part, on pseudorange measurements, determining quantitative assessments of such pseudorange measurements and terminating a process to improve accuracy of pseudorange measurements according to particular embodiments, and that claimed subject matter is not limited in these respects.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
   determining quantitative assessments of accuracy associated with a plurality of pseudorange measurements to space vehicles (SVs) at a location, wherein the plurality of pseudorange measurements are determined at a satellite positioning system (SPS) receiver;
   weighting at least some of said quantitative assessments according to geometries associated with said SVs to generate weighted quantitative assessments;
   determining a location accuracy metric based on the weighted quantitative assessments; and
   selectively performing a SV signal search process in the SPS receiver to improve said accuracy of said plurality of said pseudorange measurements based in part on the location accuracy metric.

2. The method of claim 1, and further comprising determining said quantitative assessments of said accuracy associated with said plurality of said pseudorange measurements based, at least in part, on root mean square error estimates associated with said pseudorange measurements.

3. The method of claim 1, and further comprising determining said weighting of at least some of said quantitative measurements based, at least in part, on elevation angles associated with locations of said SVs.

4. The method of claim 3, and further comprising determining said weighting of at least some of said quantitative measurements based, at least in part, on azimuth angles associated with said locations of said SVs.

5. The method of claim 1, wherein said location accuracy metric comprises a weighted horizontal dilution of precision.

6. The method of claim 1, wherein said process to improve said accuracy of said plurality of said pseudorange measurements comprises processing signals received from at least some of said SVs over a dwell.

7. The method of claim 1, wherein said selectively performing said process to improve said accuracy of said plurality of pseudorange measurements further comprises:
   selectively performing said process to improve said accuracy in response to a comparison of said location accuracy metric with a threshold value.

8. An apparatus comprising:
   a computing platform, said computing platform being adapted to:
   determine quantitative assessments of accuracy associated with a plurality of pseudorange measurements to space vehicles (SVs) at a location;
   weight at least some of said quantitative assessments according to geometries associated with said SVs to generate weighted quantitative assessments;
   determine a location accuracy metric based on the weighted quantitative assessments; and
   selectively perform a SV signal search process to improve said accuracy of said plurality of said pseudorange measurements based in part on the location accuracy metric.

9. The apparatus of claim 8, wherein said computing platform is further adapted to determine said quantitative assessments of said accuracy associated with said plurality of said pseudorange measurements based, at least in part, on root mean square error estimates associated with said pseudorange measurements.

10. The apparatus of claim 8, wherein said computing platform is further adapted to determine said weighting of at least some of said quantitative measurements based, at least in part, on elevation angles associated with locations of said SVs.

11. The apparatus of claim 10, wherein said computing platform is further adapted to determine said weighting of at least some of said quantitative measurements based, at least in part, on azimuth angles associated with said locations of said SVs.

12. The apparatus of claim 8, wherein said location accuracy metric comprises a weighted horizontal dilution of precision.

13. The apparatus of claim 8, wherein said process to improve said accuracy of said plurality of said pseudorange measurements comprises processing signals received from at least some of said SVs over a dwell.

14. The apparatus of claim 8, wherein said computing platform is further adapted to:
   selectively perform said process to improve said accuracy in response to a comparison of said location accuracy metric with a threshold value.

15. An article comprising:
   a storage medium comprising machine-readable instructions stored thereon which, when executed, are adapted to:
   determine quantitative assessments of accuracy associated with a plurality of pseudorange measurements to space vehicles (SVs) at a location;
   weighting at least some of said quantitative assessments according to geometries associated with said SVs to generate weighted quantitative assessments;
   determining a location accuracy metric based on the weighted quantitative assessments; and
   selectively perform a SV signal search process to improve said accuracy of said plurality of said pseudorange measurements based in part on the location accuracy metric.

16. The article of claim 15, wherein said machine-readable instructions, when executed, are further adapted to determine said quantitative assessments of said accuracy associated with said plurality of said pseudorange measurements based, at least in part, on root mean square error estimates associated with said pseudorange measurements.

17. The article of claim 15, wherein said machine-readable instructions, when executed, are further adapted to determine said weighting of at least some of said quantitative measurements based, at least in part, on elevation angles associated with locations of said SVs.

18. The article of claim 17, wherein said machine-readable instructions, when executed, are further adapted to determine said weighting of at least some of said quantitative measurements based, at least in part, on azimuth angles associated with said locations of said SVs.

19. The article of claim 15, wherein said location accuracy metric comprises a weighted horizontal dilution of precision.

20. The article of claim 15, wherein said process to improve said accuracy of said plurality of said pseudorange measurements comprises processing signals received from at least some of said SVs over a dwell.

21. The article of claim 15, wherein said machine-readable instructions, when executed, are further adapted to:
selectively perform said process to improve said accuracy in response to a comparison of said location accuracy metric with a threshold value.

22. A system comprising:
a position determination entity (PDE); and
a subscriber unit, the subscriber unit being adapted to:
receive an acquisition assistance message from said PDE over a terrestrial wireless communication link, said acquisition assistance message comprising information indicative of geometries associated with space vehicles (SVs);
determine quantitative assessments of accuracy associated with a plurality of pseudorange measurements to at least some of said SVs;
weight at least some of said quantitative assessments according to geometries associated with said SVs to generate weighted quantitative assessments;
determine a location accuracy metric based on the weighted quantitative assessments; and
selectively perform a SV signal search process to improve said accuracy of said plurality of said pseudorange measurements based in part on the location accuracy metric.

23. A position determination entity comprising:
a receiver to receive pseudorange measurements to space vehicles (SVs) from a subscriber station over a data link, said position determination entity being adapted to:
determine quantitative assessments of accuracy associated with at least some of said received pseudorange measurements;
weight at least some of said quantitative assessments according to geometries associated with said SVs to generate weighted quantitative assessments;
determine a location accuracy metric based on the weighted quantitative assessments; and
selectively initiate a SV signal search process to improve said accuracy of said plurality of said pseudorange measurements based in part on the location accuracy metric.

24. The position determination entity of claim 23, wherein said position determination entity is further adapted to determine said quantitative assessments of said accuracy associated with said plurality of said pseudorange measurements based, at least in part, on root mean square error estimates associated with said pseudorange measurements.

25. The position determination entity of claim 23, wherein said position determination entity is further adapted to determine said weighting of at least some of said quantitative measurements based, at least in part, on elevation angles associated with locations of said SVs.

26. The position determination entity of claim 25, wherein said position determination entity is further adapted to determine said weighting of at least some of said quantitative measurements based, at least in part, on azimuth angles associated with said locations of said SVs.

27. The position determination entity of claim 23, wherein said position determination entity is further adapted to:
selectively initiate said process to improve said accuracy in response to a comparison of said location accuracy metric with a threshold value.

28. The position determination entity of claim 23, and further comprising a transmitter to transmit a message to said subscriber station to terminate said process.

29. A subscriber unit comprising:
receiver to receive an acquisition assistance (AA) message from a data link, said AA message comprising information indicative of geometries associated with space vehicles (SVs), said subscriber unit being adapted to:
determine quantitative assessments of accuracy associated with a plurality of pseudorange measurements to at least some of said SVs;
weight at least some of said quantitative assessments according to geometries associated with said SVs to generate weighted quantitative assessments;
determine a location accuracy metric based on the weighted quantitative assessments; and
selectively perform a SV signal search process to improve said accuracy of said plurality of said pseudorange measurements based in part on the location accuracy metric.

30. The subscriber station of claim 29, wherein said subscriber station is further adapted to determine said quantitative assessments of said accuracy associated with said plurality of said pseudorange measurements based, at least in part, on root mean square error estimates associated with said pseudorange measurements.

31. The subscriber station of claim 29, wherein said subscriber station is further adapted to determine said weighting of at least some of said quantitative measurements based, at least in part, on approximations of elevation angles associated with locations of said SVs received in said AA message.

32. The subscriber station of claim 31, wherein said subscriber station is further adapted to determine said weighting of at least some of said quantitative measurements based, at least in part, on approximation of said azimuth angles associated with said locations of said SVs received in said AA message.

33. The subscriber station of claim 29, wherein said process to improve said accuracy of said plurality of said pseudorange measurements comprises processing signals received from at least some of said SVs over a dwell.

34. The subscriber station of claim 29, wherein said subscriber station is further adapted to:
selectively perform said process to improve said accuracy in response to a comparison of said location accuracy metric with a threshold value.

35. A method comprising:
correlating, with a correlator, a code phase of a received signal to determine a pseudorange measurement to each of a plurality of space vehicles (SVs) at a location;
determining, with a subscriber station processing unit, quantitative assessments of accuracy associated with a plurality of pseudorange measurements;

determining, with the subscriber station processing unit, a horizontal dilution of precision value based on the quantitative assessments;

comparing, with the subscriber station processing unit, the horizontal dilution of precision value to a predetermined threshold; and selectively performing a SV signal search process in a satellite positioning system receiver to improve said accuracy of said plurality of said pseudorange measurements based in part on the comparison.

* * * * *